United States Patent
Han et al.

(10) Patent No.: US 9,780,395 B2
(45) Date of Patent: Oct. 3, 2017

(54) FUEL CELL APPARATUS AND METHOD OF OPERATION

(75) Inventors: Ming Han, Singapore (SG); Ee Ho Gareth Tang, Singapore (SG); Yunzhong Chen, Singapore (SG)

(73) Assignee: TEMASEK POLYTECHNIC, Singapore (SG)

( * ) Notice: Subject to any disclaimer, the term of this patent is extended or adjusted under 35 U.S.C. 154(b) by 405 days.

(21) Appl. No.: 14/388,639

(22) PCT Filed: Mar. 30, 2012

(86) PCT No.: PCT/SG2012/000111
§ 371 (c)(1),
(2), (4) Date: Sep. 26, 2014

(87) PCT Pub. No.: WO2013/147703
PCT Pub. Date: Oct. 3, 2013

(65) Prior Publication Data
US 2015/0056532 A1    Feb. 26, 2015

(51) Int. Cl.
*H01M 8/04* (2016.01)
*H01M 8/02* (2016.01)
(Continued)

(52) U.S. Cl.
CPC ..... *H01M 8/04089* (2013.01); *H01M 8/0438* (2013.01); *H01M 8/04097* (2013.01); *H01M 8/04126* (2013.01); *H01M 8/04156* (2013.01); *H01M 8/04201* (2013.01); *H01M 8/04223* (2013.01); *H01M 8/04291* (2013.01); *H01M 8/04746* (2013.01); *H01M 8/04753* (2013.01);
(Continued)

(58) Field of Classification Search
CPC ............... H01M 8/04; H01M 8/04089; H01M 8/04291; H01M 8/04835; H01M 8/04097
See application file for complete search history.

(56) References Cited

U.S. PATENT DOCUMENTS

| 5,366,818 A | 11/1994 | Wilkinson et al. |
| 6,936,359 B2 | 8/2005 | Kobayashi et al. |
| (Continued) | | |

FOREIGN PATENT DOCUMENTS

| CN | 101548420 A | 9/2009 |
| CN | 101689651 A | 3/2010 |
| DE | 102007028743 A1 | 4/2008 |
| EP | 1020942 A1 | 7/2000 |
| WO | 2008108737 A1 | 9/2008 |
| WO | 2011051338 A1 | 5/2011 |
| WO | 2012036143 A1 | 3/2012 |

OTHER PUBLICATIONS

International Search Report and Written Opinion for International Application No. PCT/SG2012/000111, dated May 22, 2012, 7 pages.

*Primary Examiner* — Kenneth Douyette
(74) *Attorney, Agent, or Firm* — Fredrikson & Byron, P.A.

(57) ABSTRACT

A fuel cell apparatus (10) and method (50) of operating a fuel cell are provided. The fuel cell apparatus (10) includes a fuel cell assembly (12) having a first outlet (26) and a first vessel (34) coupled to the first outlet (26) and forming a first dead end. The first vessel (34) is arranged to receive and hold a portion of a first reactant and water when a supply of the first reactant is being fed to the fuel cell assembly (12) and to return the first reactant in the first vessel (34) to the fuel cell assembly (12) via the first outlet (26) when the supply of the first reactant to the fuel cell assembly (12) is cut off.

29 Claims, 7 Drawing Sheets

(51) Int. Cl.
*H01M 8/00* (2016.01)
*H01M 8/04089* (2016.01)
*H01M 8/04828* (2016.01)
*H01M 8/04119* (2016.01)
*H01M 8/04082* (2016.01)
*H01M 8/04223* (2016.01)
*H01M 8/04291* (2016.01)
*H01M 8/0438* (2016.01)
*H01M 8/04746* (2016.01)
*H01M 8/1018* (2016.01)

(52) U.S. Cl.
CPC ... *H01M 8/04761* (2013.01); *H01M 8/04835* (2013.01); *H01M 8/04843* (2013.01); *H01M 2008/1095* (2013.01)

(56) References Cited

U.S. PATENT DOCUMENTS

| | | |
|---|---|---|
| 7,597,982 B2 | 10/2009 | Sakaue et al. |
| 7,976,992 B2 | 7/2011 | Darling et al. |
| 2005/0142400 A1 | 6/2005 | Turco et al. |
| 2007/0190374 A1 | 8/2007 | Harada et al. |
| 2008/0057372 A1 | 3/2008 | Sommer et al. |
| 2009/0068507 A1 | 3/2009 | Shin |
| 2009/0104478 A1 | 4/2009 | Wahlmuller et al. |
| 2009/0214915 A1 | 8/2009 | Kwon |
| 2009/0297896 A1* | 12/2009 | Kimbara ............... F17C 11/005 429/437 |
| 2010/0055528 A1 | 3/2010 | Lee et al. |

\* cited by examiner

FUEL CELL APPARATUS AND METHOD OF OPERATION

RELATED APPLICATIONS

This application is a 35 U.S.C. 371 national stage filing from International Application No. PCT/SG2012/000111 filed Mar. 30, 2012, the teachings of which are incorporated herein by reference.

FIELD OF THE INVENTION

The present invention relates to fuel cell technology and more particularly to a proton exchange membrane fuel cell (PEMFC) apparatus and a method of operating the same.

BACKGROUND OF THE INVENTION

Proton exchange membrane (PEM) fuel cells can be operated in an open mode or a dead-end mode.

In the open mode, excess water is discharged from the fuel cell by continuous convective forces provided by the flow of excess gases. Consequently, gas utilization rates in such systems are typically less than 100 percent (%) and thus fuel and oxidant are supplied at a higher rate to an open mode fuel cell than is required for a complete electrochemical reaction. To increase gas efficiency, unreacted fuel and/or oxidant is usually re-circulated back into the fuel cell using a blowing or pumping system, resulting in a higher pressure drop in the fuel cell and additional power consumption.

In the dead-end mode, at least one of the outlet ports of a fuel cell is blocked. Advantageously, lower power consumption and a higher fuel/oxidant utilization rate are achievable with a fuel cell operating in the dead-end mode. A disadvantage though is that a periodic gas purge is required of conventional dead-end fuel cell systems to prevent flooding. Conventional dead-end fuel cell systems are provided with a purge valve to remove excess water and this complicates the control system. Furthermore, unreacted fuel/oxidant is lost during the purge process and this reduces the gas utilization efficiency.

It is therefore desirable to have a dead end fuel cell system that is able to prevent flooding without purging.

SUMMARY OF THE INVENTION

Accordingly, in a first aspect, there is provided fuel cell apparatus including a fuel cell assembly having a first outlet, and a first vessel coupled to the first outlet and forming a first dead-end. The first vessel is arranged to receive and hold a portion of a first reactant and water when a supply of the first reactant is being fed to the fuel cell assembly and to return the first reactant in the first vessel to the fuel cell assembly via the first outlet when the supply of the first reactant to the fuel cell assembly is cut off.

In a second aspect, there is provided a method of operating a fuel cell including supplying a fuel and an oxidant to a fuel cell assembly. A portion of a first reactant is driven through the fuel cell assembly and into a first vessel via a first outlet and water in the fuel cell assembly is carried by a convective flow of the first reactant into the first vessel via the first outlet. The portion of the first reactant and the water are retained in the first vessel. The first reactant in the first vessel is returned to the fuel cell assembly via the first outlet when a supply of the first reactant to the fuel cell assembly is cut off.

Other aspects and advantages of the invention will become apparent from the following detailed description, taken in conjunction with the accompanying drawings, illustrating by way of example the principles of the invention.

BRIEF DESCRIPTION OF THE DRAWINGS

Embodiments of the invention will now be described, by way of example only, with reference to the accompanying drawings, in which.

DETAILED DESCRIPTION OF EXEMPLARY EMBODIMENTS

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

Figure 1:
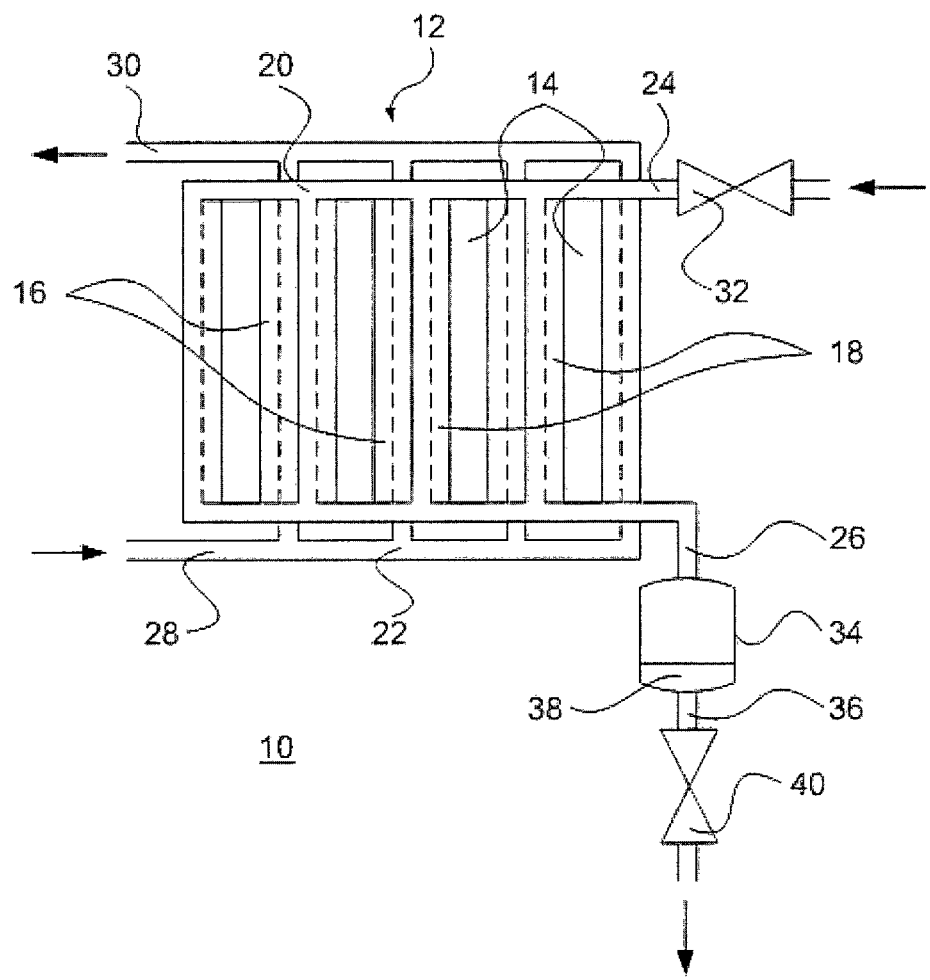
FIG. 1 is a schematic diagram of a fuel cell apparatus in accordance with one embodiment of the present invention.

Referring now to FIG. 1, a fuel cell apparatus 10 is shown. The fuel cell apparatus 10 includes a fuel cell assembly 12 with proton exchange membranes (PEMs) 14 sandwiched between cathodes 16 and anodes 18. A series of first channels 20 and a series of second channels 22 are in fluid communication with the membrane electrode assembly of the fuel cell assembly 12. The series of first channels 20 of the fuel cell assembly 12 includes a fuel inlet port 24 and a fuel outlet port 26 and the series of second channels 22 of the fuel cell assembly 12 includes an oxidant inlet port 28 and an oxidant outlet port 30. A first valve 32 is connected to the fuel inlet port 24 and a vessel 34 is connected to the fuel outlet port 26. The vessel 34 is in fluid communication with the fuel cell assembly 12 and forms an anode dead-end in the fuel cell apparatus 10. The vessel 34 is provided with a water outlet port 36 to discharge water 38 from the vessel 34. A second valve 40 is connected to the water outlet port 36.

Membrane electrode assemblies of proton exchange membrane fuel cells (PEMFCs) are well known to those of ordinary skill in the art. Accordingly, a detailed description of the fuel cell assembly 12 is not required for a complete understanding of the present invention. Furthermore, although a fuel cell stack with four (4) cells is illustrated in the present embodiment, it will be understood by those of ordinary skill in the art that the present invention is not limited to fuel cell stacks or by the number of cells in the fuel cell stack. In alternative embodiments, the fuel cell assembly 12 may comprise a single fuel cell or have greater or fewer cells than illustrated in the present embodiment.

Fuel is periodically supplied into the series of first channels 20 and the vessel 34 via the fuel inlet port 24. The fuel may be pure hydrogen or hydrogen mixed with an inert gas such as, for example, nitrogen or argon. In one embodiment, the fuel is supplied to the fuel cell assembly 12 at a pressure of about 2 bar.

An oxidant is supplied into the series of second channels 22 via the oxidant inlet port 28. The oxidant may be oxygen or air.

The first valve 32 is arranged to control a supply of the fuel to the fuel cell assembly 12. The supply of the fuel to the fuel cell assembly 12 may be time regulated, pressure regulated or both time and pressure regulated. In the present embodiment, the first valve 32 is an electrically actuated valve. In one embodiment, the first valve 32 may be a solenoid check valve that is fluidly connected to the fuel inlet port 24 of the fuel cell apparatus 10 to periodically supply fuel at certain pressure ranges. In one embodiment, the first valve 32 may be arranged to be continuously opened and closed at periodic time intervals. In such an embodiment, the first valve 32 may, for example, be arranged to be kept open for a period of between about 3 seconds (s) and about 20 s before being closed and the first valve 32 may, for example, be arranged to be kept closed for a period of between about 1 s and about 7 s before being reopened. In the same or a different embodiment, the first valve 32 may be arranged to be continuously opened and closed depending on a pressure in the fuel cell assembly 12. In one such embodiment, the first valve 32 may be arranged to be automatically opened again when a pressure in the fuel cell assembly 12 is reduced to a predetermined level of about 1.5 bar.

The vessel 34 is arranged to receive and hold a portion of the fuel and water (in both liquid and vapour form) when a supply of fuel is being fed to the fuel cell assembly 12 and to return the fuel in the vessel 34 to the fuel cell assembly 12 via the fuel outlet port 26 when the supply of the fuel to the fuel cell assembly 12 is cut off. In the embodiment shown, the vessel 34 is fluidly connected to the anodes 18 of the fuel cell assembly 12 via the first channels 20 and blocks the fuel outlet port 26 to form a fuel cell system operating in an anode dead-end mode. The vessel 34 functions as a pressure-swing chamber and may be any closed container with an inlet that is fluidly connected to the fuel outlet port 26. The vessel 34 may be shaped in the form of a cylinder, a cube or a ball, most preferably in the shape of a cylinder. In the present embodiment, the vessel 34 has a pressure resistance of at least about 5 bar. The vessel 34 may be made of metal, a polymer, a composite material or ceramic.

The second valve 40 is arranged to control a discharge of liquid water 38 from the vessel 34. Condensed water 38 accumulated at the bottom of the vessel 34 may be discharged either manually or automatically through the water outlet port 36 via the second valve 40. As the amount of water produced in the reaction is limited, a water discharge process is only required once in several hours or even days. Therefore, the second valve 40 is typically closed.

Operation of the fuel cell apparatus 10 of FIG. 1 will now be described below with reference to FIG. 2.

Figure 2:
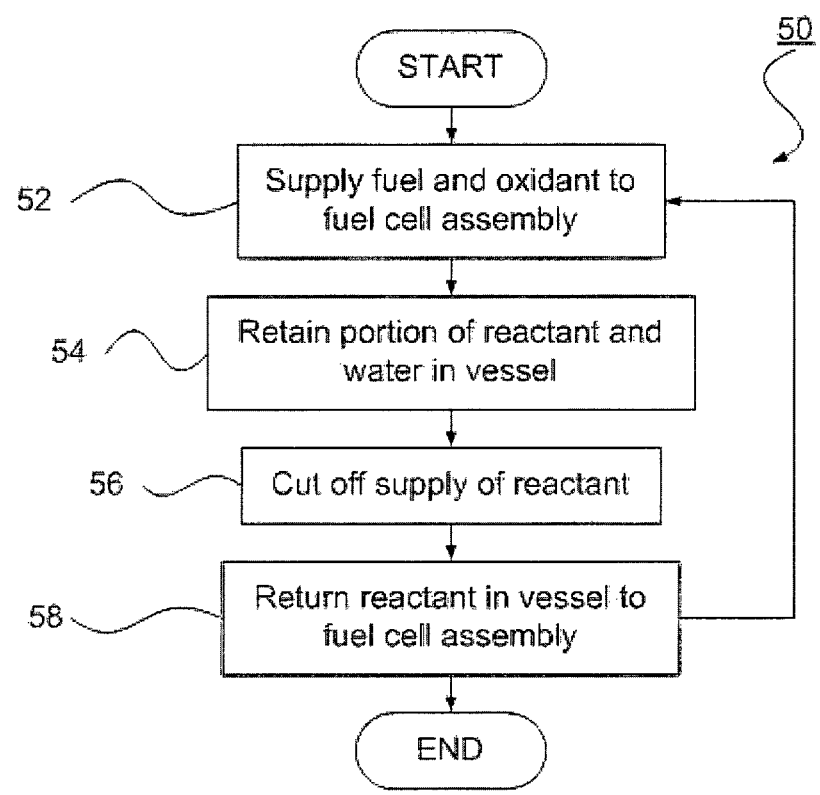
FIG. 2 is a schematic flow diagram illustrating a method of operating a fuel cell in accordance with one embodiment of the present invention.

Referring now to FIG. 2, a flow diagram of a method 50 of operating a fuel cell is shown. The method begins at step 52 when a fuel and an oxidant are supplied to the fuel cell assembly 12. In this step, the first valve 32 is opened and the fuel flows into the series of first channels 20 as well as the vessel 34. Hydrogen atoms in the fuel split into protons and electrons and the protons pass through the membranes 14 into the cathodes 16 where the protons combine with oxygen atoms as well as electrons arriving through an external circuit (not shown) to form water. Electricity is generated by the flow of electrons in the external circuit. A portion of the fuel is driven through the fuel cell assembly 12 and into the vessel 34 via the fuel outlet port 26.

Water generated in the cathodes 16 helps to keep the membranes 14 saturated with water. This is beneficial to proton diffusion in the membranes 14 and helps to reduce ohmic loss. When water diffusion from the cathodes 16 to the anodes 18 exceeds the amount of water returning from the anodes 18 via electro-osmotic drag, water may be accumulated in the anode side and adjoining flow channels of the fuel cell assembly 12.

When the first valve 32 is opened, the pressure in the fuel cell assembly 12 is higher than that in the vessel 34. The reactant gas (in this embodiment the fuel) therefore flows into the vessel 34 and carries excess water into the vessel 34. Accordingly, water in the fuel cell assembly 12 is carried by a convective flow of the fuel into the vessel 34 via the first outlet port 26. More particularly, water accumulated in the downstream part of the first channels 20 is carried to the vessel 34 by the convective force of the gaseous fuel flow.

The portion of the fuel that is driven through the fuel cell assembly 12 and the water that is carried by the convective flow of the fuel into the vessel 34 are retained in the vessel 34 at step 54. This causes the pressure in the vessel 34 to increase substantially. The increase in pressure facilitates condensation of water vapour in the vessel 34.

At step 56, the supply of fuel to the fuel cell assembly 12 is cut off.

When the supply of the reactant to the fuel cell assembly 12 is cut off, the fuel in the vessel 34 is returned to the fuel cell assembly 12 via the first outlet port 26 at step 58. More particularly, when the first valve 32 is closed, the pressure in the fuel cell assembly 12 becomes lower than that in the vessel 34 as the reactant is consumed in the fuel cell assembly 12. The reactant gas inside the vessel 34 then flows back through the same route into the fuel cell assembly 12 and disperses the accumulated vapour near the end of the channels 20 into the top part of the channels 20. It should be emphasized that the reactant gas in the vessel 34 is not simply returned to the fuel cell through the inlet 24 but instead swings back through the same route and thus is able to disperse the vapour along the channels 20 of the fuel cell assembly 12. Accumulated water in the fuel cell assembly 12 is thus dispersed when the fuel in the vessel 34 is returned to the fuel cell assembly 12. More particularly, water vapour near the end portions of the anode channels 20 is dispersed to an upper portion of the fuel cell apparatus 10. Advantageously, this helps to maintain uniform water distribution in the membranes 14 and prevent flooding in the first and second channels 20 and 22 and gas diffusion layers of the fuel cell apparatus 10.

As the fuel flows back from the vessel 34 to the fuel cell assembly 12 where it is consumed, the pressure in the vessel 34 decreases. Because the fuel cell assembly 12 is continually supplied with fuel either from an external source or the vessel 34, the electrochemical reaction in the fuel cell apparatus 10 continues despite the cessation of the fuel supply from the external source and there is consequently little or no disruption to the power output of the fuel cell apparatus 10.

Fuel is resupplied to the fuel cell assembly 12 at step 52 and the fuel cell apparatus 10 enters a new pressure swing cycle.

The pressure swing cycles continue when the fuel cell is in operation and end when the fuel cell is no longer in operation.

The supply of the reactant, in this embodiment the fuel, to the fuel cell assembly 12 may be time regulated, pressure regulated or both time and pressure regulated. In a time regulated embodiment, the supply of the reactant to the fuel cell assembly 12 may be cut off after a period of between about 3 s and about 20 s by closing off the first valve 32. In the same or a different embodiment, the first valve 32 may be reopened after the supply of the reactant is cut off for a period of between about 1 s and about 7 s. The first valve 32 may be automatically reopened to allow the reactant gas to flow into the first channels 20 and vessel 34 again. In a pressure regulated embodiment, the reactant is resupplied to the fuel cell assembly 12 when pressure in the vessel 34 is reduced to a predetermined level of about 1.5 bar due to the consumption of the reactant gas in the fuel cell apparatus 10.

Liquid water 38 may be discharged from the vessel 34 via the water outlet port 36 when a significant quantity has accumulated in the vessel 34.

Although the method 50 of operating a fuel cell is described with reference to a fuel cell operating in an anode dead-end mode, it should be understood by those of ordinary skill in the art that the method of the present invention is not limited to only the anode dead-end mode. In alternative embodiments, the method 50 may be employed on a fuel cell operating in a cathode dead-end mode or an anode dead/cathode dead mode. In the cathode dead-end mode embodiment, the reactant involved is an oxidant such as, for example, pure oxygen. An example of such an embodiment is described below with reference to FIG. 5. In the anode dead/cathode dead mode embodiment, there are two reactants involved: a fuel and an oxidant. A portion of the second reactant is driven through the fuel cell assembly and into a second vessel via a second outlet. Water in the fuel cell assembly is carried by a convective flow of the second reactant into the second vessel via the second outlet. The portion of the second reactant and the water are retained in the second vessel, and the second reactant in the second vessel is returned to the fuel cell assembly via the second outlet when a supply of the second reactant to the fuel cell assembly is cut off. An example of such an embodiment is described below with reference to FIG. 7.

Figure 3:
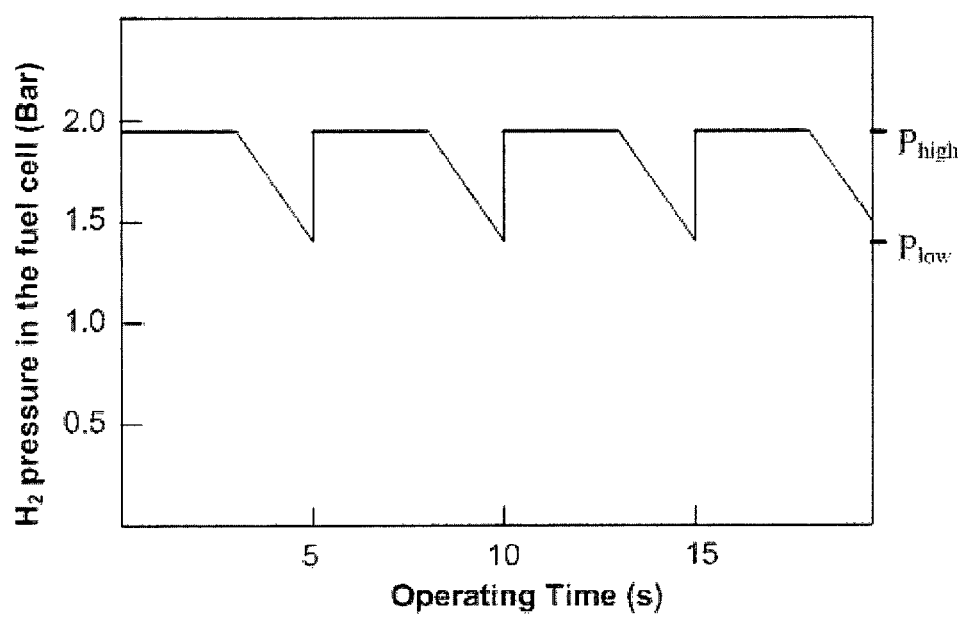
FIG. 3 is a graph showing hydrogen pressure in the fuel cell apparatus of FIG. 1 over time.

Referring now to FIG. 3, a graph illustrating hydrogen pressure in the fuel cell apparatus 10 of FIG. 1 over time is shown. As can be seen from FIG. 3, the hydrogen pressure in the fuel cell apparatus 10 is at a high of about 2 bar and is maintained at this pressure ($P_{high}$) when the first valve 32 is open. When the first valve 32 is closed off, the hydrogen pressure in the fuel cell apparatus 10 starts to fall as hydrogen returning from the vessel 34 to the fuel cell assembly 12 is consumed. The first valve 32 is reopened again when the hydrogen pressure drops below about 1.5 bar ($P_{low}$) and the fuel cell apparatus 10 enters a new pressure swing cycle. As can be seen also from FIG. 3, pressure in the vessel 34 is kept at between about 1.5 bar and about 2 bar to facilitate the pressure swing back. Pressure in the pressure swing vessel 34 does not drop to atmospheric pressure.

Figure 4:
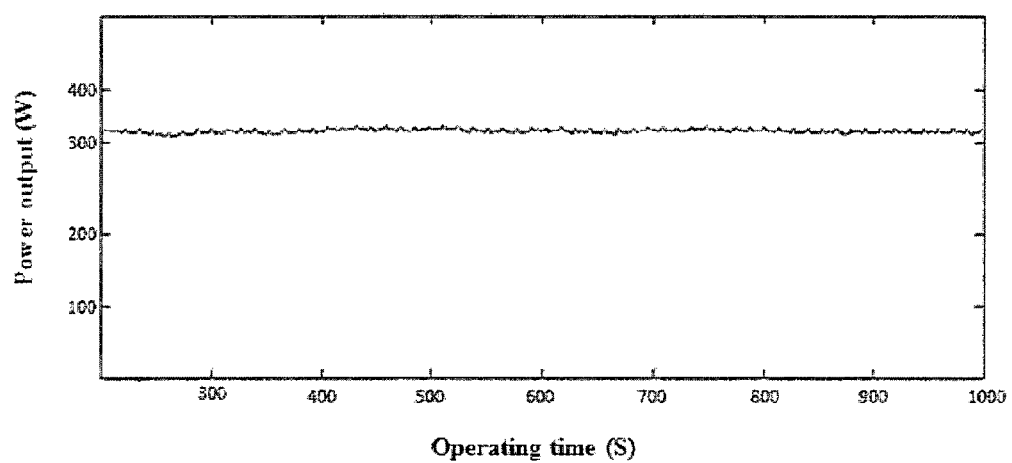
FIG. 4 is a graph showing a power output of the fuel cell apparatus of FIG. 1 over time.

Referring now to FIG. 4, a graph illustrating a power output of the fuel cell apparatus 10 of FIG. 1 over time is shown. As can be seen from FIG. 4, the power output of the fuel cell apparatus 10 remains stable over a relatively long period of operation.

A solid polymer fuel cell system 10 for anodic side water management through pressure swinging and excess water discharging has been described above with reference to FIGS. 1-4. The pressure swing vessel 34 in the fuel cell apparatus 10 provides multiple functions; the vessel 34 acts as a pressure adjustor, a buffer tank and a liquid-gas separator. In the described embodiment, water near the end part of the fuel cells is pushed to the front part of the anode channels during the pressure swing. Advantageously, this helps to distribute water evenly within the cells and prevent local flooding. Consequently, there is little or no voltage decay over time attributed to flooding. Furthermore, as the system is totally purge free, that is, the system runs continuously without a purge process, better fuel efficiency is achieved compared to conventional fuel cell systems operating in the dead-end mode where a periodic gas purge is required.

Figure 5:
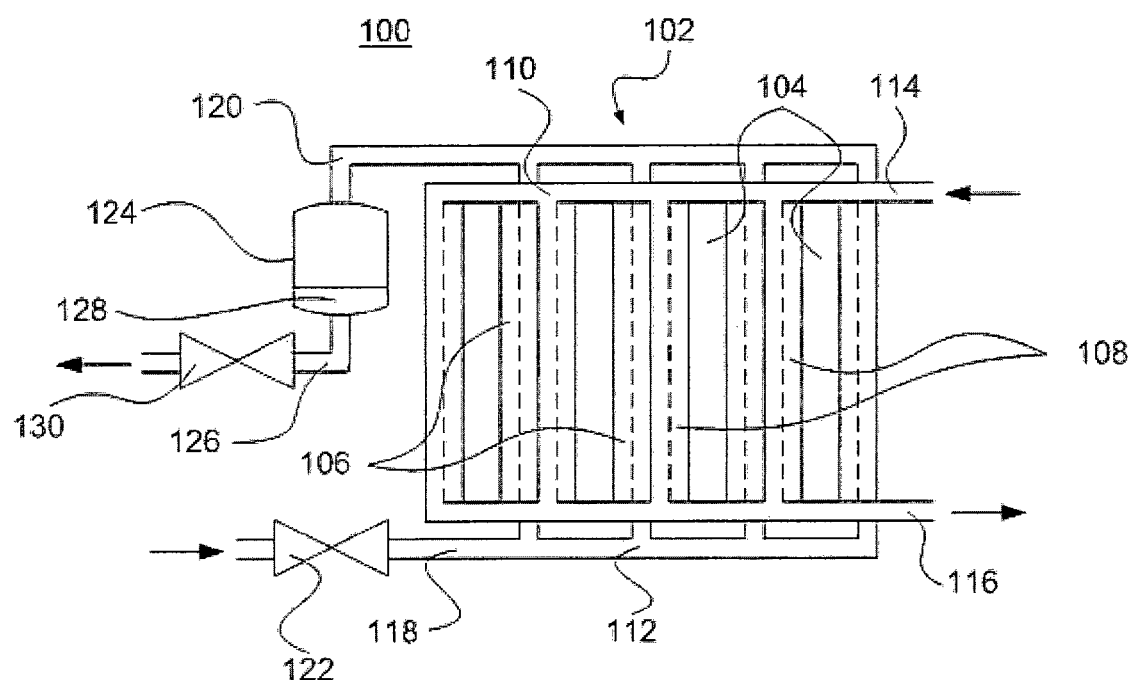
FIG. 5 is a schematic diagram of a fuel cell apparatus in accordance with another embodiment of the present invention.

Referring now to FIG. 5, a fuel cell apparatus 100 in accordance with another embodiment of the present invention is shown. The fuel cell apparatus 100 includes a fuel cell assembly 102 of proton exchange membranes (PEMs) 104 sandwiched between cathodes 106 and anodes 108. A series of first channels 110 and a series of second channels 112 are in fluid communication with the membrane electrode assembly of the fuel cell assembly 102. The series of first channels 110 of the fuel cell assembly 102 includes a fuel inlet port 114 and a fuel outlet port 116 and the series of second channels 112 of the fuel cell assembly 102 includes an oxidant inlet port 118 and an oxidant outlet port 120. A first valve 122 is connected to the oxidant inlet port 118 and a vessel 124 is connected to the oxidant outlet port 120. The vessel 124 is in fluid communication with the fuel cell assembly 102 and forms a cathode dead-end in the fuel cell apparatus 100. The vessel 124 is provided with a water outlet port 126 to discharge water 128 from the vessel 124. A second valve 130 is connected to the water outlet port 126.

The embodiment illustrated in FIG. 5 is substantially similar to that of FIG. 1, but differs in that it illustrates a fuel cell system operating in the condition of an anode open/cathode dead mode. In this embodiment, a continuous stream of fuel is supplied into the anode side of the fuel cell apparatus 100 through the fuel inlet port 114 and the fuel outlet port 116 is not blocked. The first valve 122 is arranged to control a supply of the oxidant to the fuel cell assembly 102. The supply of the oxidant to the fuel cell assembly 102 may be time regulated, pressure regulated or both time and pressure regulated. The oxidant in this embodiment is pure oxygen. In one embodiment, the oxidant is periodically supplied to the fuel cell assembly 102 at a pressure of about 2 bar. The vessel 124 is used to block the oxidant outlet port 120, thereby forming a fuel cell assembly operating in a cathode dead-end mode. In this embodiment, the oxidant utilization efficacy is improved since no unreacted oxidant is discharged. The fuel cell apparatus 100 operates in a similar manner to that illustrated in FIG. 1. Accordingly, a detailed description of the elements of FIG. 5 is not required for a complete understanding of the present invention.

Figure 6:
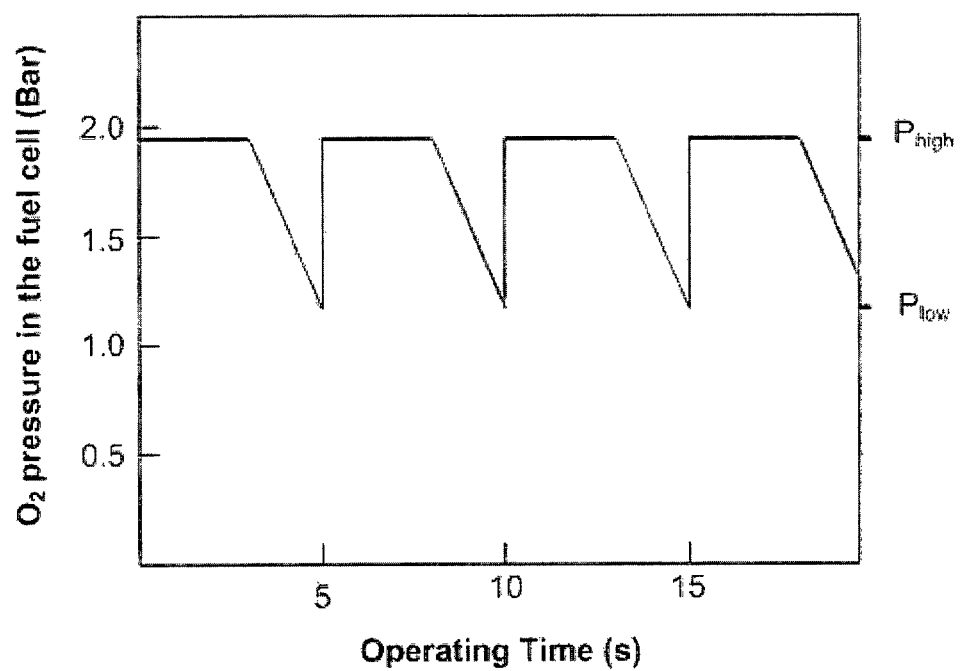
FIG. 6 is a graph showing oxygen pressure in the fuel cell apparatus of FIG. 5 over time.

Referring now to FIG. 6, a graph illustrating oxygen pressure in the fuel cell apparatus 100 of FIG. 5 over time is shown. As can be seen from FIG. 6, the oxygen pressure in the fuel cell apparatus 100 is at a high of about 2 bar and is maintained at this pressure ($P_{high}$) when the first valve 122 is open. When the first valve 122 is closed off, the oxygen pressure in the fuel cell apparatus 100 starts to fall as oxygen returning from the vessel 124 to the fuel cell assembly 102 is consumed. The first valve 122 is reopened again when the oxygen pressure drops below about 1.2 bar ($P_{low}$) and the fuel cell apparatus 100 enters a new pressure swing cycle. As can be seen also from FIG. 6, pressure in the vessel 124 is kept at between about 1.2 bar and about 2 bar to facilitate the pressure swing back. Pressure in the pressure swing vessel 124 does not drop to atmospheric pressure.

Figure 7:
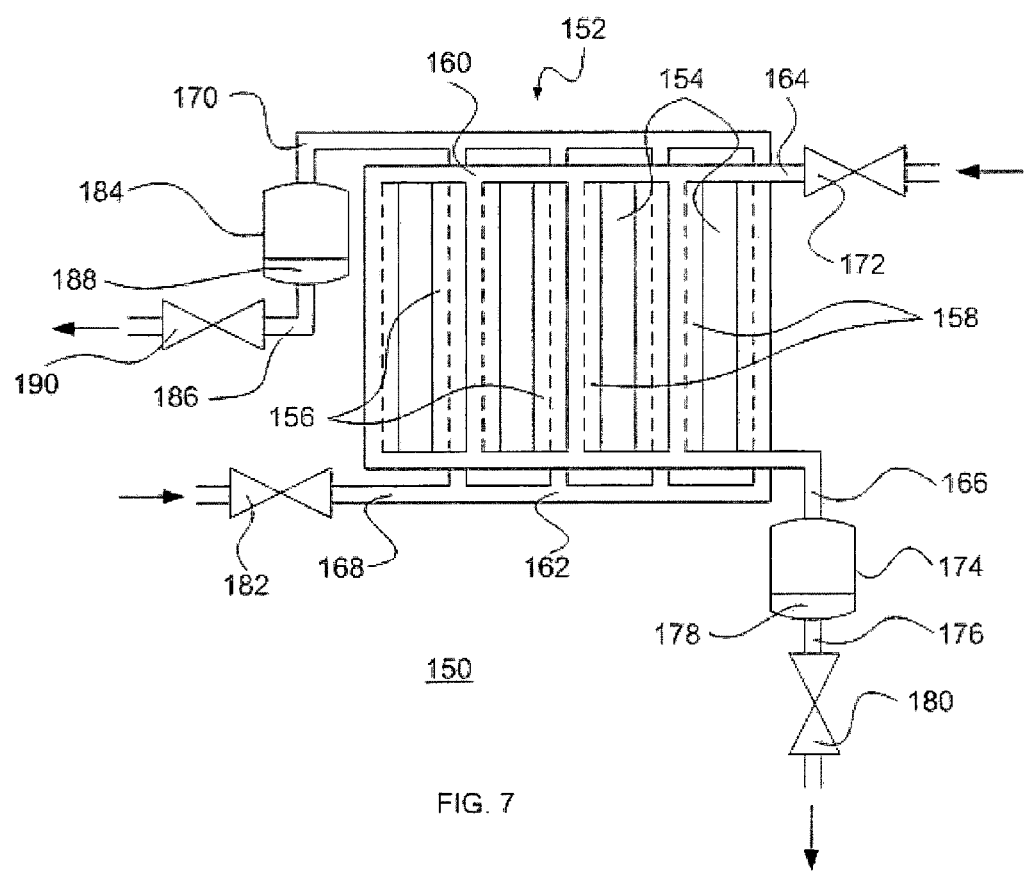
FIG. 7 is a schematic diagram of a fuel cell apparatus in accordance with yet another embodiment of the present invention.

Referring now to FIG. 7, a fuel cell apparatus 150 in accordance with yet another embodiment of the present invention is shown. The fuel cell apparatus 150 includes a fuel cell assembly 152 of proton exchange membranes (PEMs) 154 sandwiched between cathodes 156 and anodes 158. A series of first channels 160 and a series of second channels 162 are in fluid communication with the membrane electrode assembly of the fuel cell assembly 152. The series of first channels 160 of the fuel cell assembly 152 includes a fuel inlet port 164 and a fuel outlet port 166 and the series of second channels 162 of the fuel cell assembly 152 includes an oxidant inlet port 168 and an oxidant outlet port 170. A first valve 172 is connected to the fuel inlet port 164 and a first vessel 174 is connected to the fuel outlet port 166. The first vessel 174 is in fluid communication with the fuel cell assembly 152 and forms an anode dead-end in the fuel cell apparatus 150. The vessel 174 is provided with a first water outlet port 176 to discharge water 178 from the first vessel 174. A second valve 180 is connected to the first water outlet port 176. A third valve 182 is connected to the oxidant inlet port 168 and a second vessel 184 is connected to the oxidant outlet port 170. The second vessel 184 is in fluid communication with the fuel cell assembly 152 and forms a cathode dead-end in the fuel cell apparatus 150. The second vessel 184 is provided with a second water outlet port 186 to discharge water 188 from the second vessel 184. A fourth valve 190 is connected to the water outlet port 186.

The embodiment illustrated in FIG. 7 is substantially similar to that of FIGS. 1 and 5, but differs in that it illustrates a fuel cell system operating in the condition of anode dead/cathode dead mode. In this embodiment, both the fuel outlet port 166 and the oxidant outlet port 170 are blocked by the first and second pressure swing vessels 174 and 184, respectively, to form anode and cathode dead-ends. Both the first and second pressure swing vessels 174 and 184 are arranged to receive and hold a portion of the respective reactants, namely a fuel and an oxidant, and water when a supply of the reactants is being fed to the fuel cell assembly 152 and to return the reactants in the first and second pressure swing vessels 174 and 184 to the fuel cell assembly 152 via the fuel outlet port 166 and the oxidant outlet port 170, respectively, when the supply of the reactants to the fuel cell assembly 152 is cut off. In this embodiment, both fuel and oxidant utilization efficacy is improved as no unreacted fuel or oxidant is discharged. The fuel cell apparatus 150 operates in a similar manner to that illustrated in FIGS. 1 and 5. Accordingly, a detailed description of the elements of FIG. 7 is not required for a complete understanding of the present invention.

As is evident from the foregoing discussion, the present invention provides a fuel cell system that operates in a dead-end mode without requiring a purge. Advantageously, water accumulated in the flow channel near the dead-end of the anode and/or cathode side is dispersed well along the flow channel by the oscillating pressure. Flooding and voltage decay problems are thus avoided. Furthermore, because excess water is discharged through a separator without a purge process, fuel and/or oxidant utilization efficacy is also improved since no unreacted fuel and/or oxidant is discharged. The present invention is particularly suitable for portable fuel cell applications such as, for example, in underwater or aerospace applications where the fuel and oxidant efficiency is critical.

While preferred embodiments of the invention have been illustrated and described, it will be clear that the invention is not only limited to the described embodiments. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A fuel cell apparatus, comprising:
a fuel cell assembly having a first outlet; and
a first vessel coupled to the first outlet and forming a first dead-end, wherein the first vessel is arranged to receive and hold a portion of a first reactant and water when a supply of the first reactant is being fed to the fuel cell assembly and to return the first reactant in the first vessel to the fuel cell assembly via the first outlet when the supply of the first reactant to the fuel cell assembly is cut off.

2. The fuel cell apparatus of claim 1, wherein the first vessel has a pressure resistance of at least about 5 bar.

3. The fuel cell apparatus of claim 1, further comprising a first valve coupled to a first inlet of the fuel cell assembly to control the supply of the first reactant to the fuel cell assembly.

4. The fuel cell apparatus of claim 3, wherein the first valve is arranged to be continuously opened and closed at periodic time intervals.

5. The fuel cell apparatus of claim 4, wherein the first valve is arranged to be kept open for a period of between about 3 seconds (s) and about 20 s before being closed.

6. The fuel cell apparatus of claim 4, wherein the first valve is arranged to be kept closed for a period of between about 1 s and about 7 s before being reopened.

7. The fuel cell apparatus of claim 3, wherein the first valve is arranged to be continuously opened and closed depending on a pressure in the fuel cell assembly.

8. The fuel cell apparatus of claim 7, wherein the first valve is arranged to be automatically opened again when a pressure in the fuel cell assembly is reduced to a predetermined level.

9. The fuel cell apparatus of claim 8, wherein the predetermined level of pressure is about 1.5 bar.

10. The fuel cell apparatus of claim 3, wherein the first valve is an electrically actuated valve.

11. The fuel cell apparatus of claim 1, further comprising a second valve arranged to control a discharge of liquid water from the first vessel.

12. The fuel cell apparatus of claim 1, wherein the first reactant is a fuel.

13. the fuel cell apparatus of claim 1, wherein the first reactant is an oxidant.

14. The fuel cell apparatus of claim 1, further comprising a second vessel coupled to a second outlet of the fuel cell assembly and forming a second dead-end, wherein the second vessel is arranged to receive and hold a portion of a second reactant and water when a supply of the second reactant is being fed to the fuel cell assembly and to return the second reactant in the second vessel to the fuel cell assembly via the second outlet when the supply of the second reactant to the fuel cell assembly is cut off.

15. A method of operating a fuel cell apparatus, comprising:
supplying a fuel and an oxidant to a fuel cell assembly having a first outlet, wherein a portion of a first reactant is driven through the fuel cell assembly and into a first vessel coupled to the first outlet, the first vessel forming a first dead-end, and wherein water in the fuel cell assembly is carried by a convective flow of the first reactant into the first vessel via the first outlet;

retaining the portion of the first reactant and the water in the first vessel; and returning the first reactant in the first vessel to the fuel cell assembly via the first outlet when a supply of the first reactant to the fuel cell assembly is cut off.

16. The method of operating a fuel cell of claim 15, wherein accumulated water in the fuel cell assembly is dispersed when returning the first reactant in the first vessel to the fuel cell assembly.

17. The method of operating a fuel cell of claim 15, wherein the supply of the first reactant to the fuel cell assembly is time regulated.

18. The method of operating a fuel cell of claim 17, further comprising cutting off the supply of the first reactant after a period of between about 3 s and about 20 s.

19. The method of operating a fuel cell of claim 18, wherein the supply of the first reactant is cut off for a period of between about 1 s and about 7 s.

20. The method of operating a fuel cell of claim 15, wherein the supply of the first reactant to the fuel cell assembly is pressure regulated.

21. The method of operating a fuel cell of claim 20, further comprising resupplying the first reactant to the fuel cell assembly when a pressure in the first vessel is reduced to a predetermined level.

22. The method of operating a fuel cell of claim 21, wherein the first reactant is resupplied to the fuel cell assembly when the pressure in the first vessel is reduced to about 1.5 bar.

23. The method of operating a fuel cell of claim 15, further comprising discharging liquid water from the first vessel.

24. The method of operating a fuel cell of claim 15, wherein the first reactant is one of pure hydrogen and hydrogen mixed with an inert gas.

25. The method of operating a fuel cell of claim 24, wherein the first reactant is supplied to the fuel cell assembly at a pressure of about 2 bar.

26. The method of operating a fuel cell of claim 15, wherein the first reactant is pure oxygen.

27. The method of operating a fuel cell of claim 26, wherein the first reactant is supplied to the fuel cell assembly at a pressure of about 2 bar.

28. The method of operating a fuel cell of claim 15, wherein a portion of a second reactant is driven through the fuel cell assembly and into a second vessel via a second outlet and wherein the water in the fuel cell assembly is carried by a convective flow of the second reactant into the second vessel via the second outlet.

29. The method of operating a fuel cell of claim 28, further comprising:

retaining the portion of the second reactant and the water in the second vessel; and returning the second reactant in the second vessel to the fuel cell assembly via the second outlet when a supply of the second reactant to the fuel cell assembly is cut off.

* * * * *